Oct. 9, 1934. A. T. MILLER ET AL 1,975,796
LICENSE TAG PROTECTION DEVICE
Filed Aug. 16, 1933
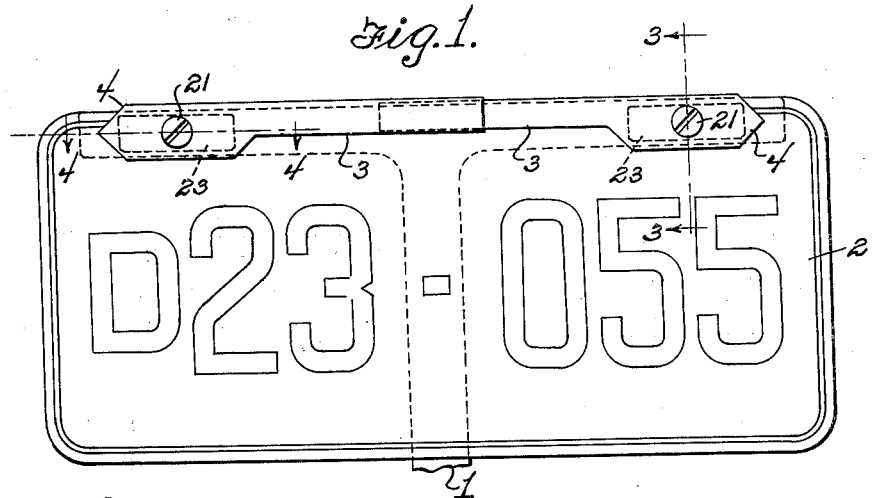
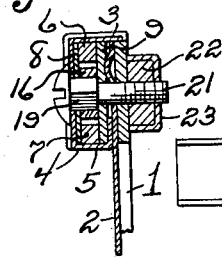
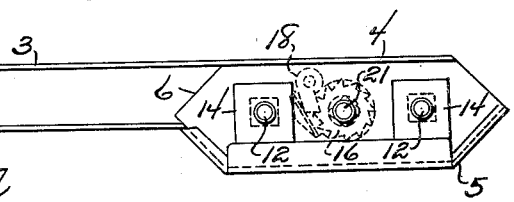
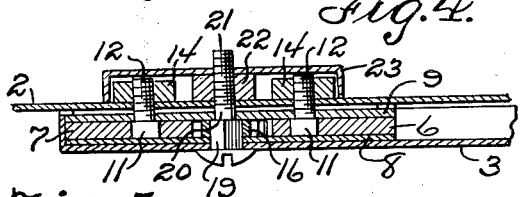
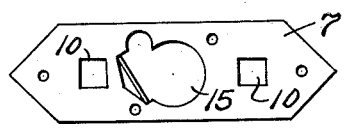
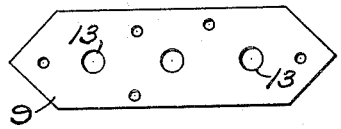
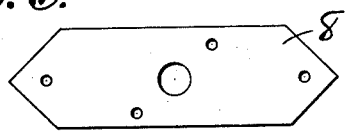
Albert T. Miller and
Percy C. Miller  INVENTORS
BY Victor J. Evans & Co.
ATTORNEY Patented Oct. 9, 1934

1,975,796

UNITED STATES PATENT OFFICE 1,975,796

LICENSE TAG PROTECTION DEVICE

Albert T. Miller and Percy C. Miller, Jacksonville, Fla.

Application August 16, 1933, Serial No. 685,434

4 Claims. (Cl. 40—125)

This invention relates to a license tag protection device and has for the primary object the provision of means for preventing unauthorized removal of the tag from its supporting bracket of the automobile without the destruction of the device which prevents thievery of tags or the general manipulation of tags from one automobile to another and further adds to the appearance of the tag and the fastening thereof to its support.

With these and other objects in view this invention consists in certain novel features of construction, combination and arrangement of parts to be hereinafter more fully described and claimed.

For a complete understanding of our invention, reference is to be had to the following description and accompanying drawing, in which Figure 1 is a front elevation illustrating a license tag secured to a support by a protecting device constructed in accordance with our invention.

Figure 2 is a plan view illustrating a portion of the protecting device.

Figure 3 is a sectional view taken on the line 3—3 of Figure 1.

Figure 4 is a sectional view taken on the line 4—4 of Figure 1.

Figure 5 is a plan view illustrating one of the plates of the protecting device having provision to receive a ratchet mechanism.

Figure 6 is a plan view illustrating a companion plate to that shown in Figure 5.

Figure 7 is a plan view illustrating another companion plate to that plate shown in Figure 5.

Figure 8 is an edge view illustrating the plate shown in Figure 7.

Referring in detail to the drawing the numeral 1 indicates a supporting bracket of a vehicle for a license plate 2. To prevent unauthorized removal or theft of the license plate our invention is employed for connecting the license plate to the bracket which when applied will provide a firm connection between the license plate and bracket to prevent rattle or undesirable noises and also will provide an attractive apearance to the tag.

It is customary to connect a tag to its bracket by a pair of fasteners and our fastener includes a pair of channel members 3 one adapted to slide within the other and each are enlarged to form a holding portion 4. The holding portion 4 is provided with retaining flanges 5 in which are mounted a combined ratchet mechanism and bolt holding medium 6 consisting of plates 7, 8 and 9 riveted or otherwise secured together. The plate 7 is arranged between the plates 8 and 9 and is provided with rectangular shaped openings 10 to receive the heads 11 of bolts 12 which extend through openings 13 in the plate 9 and through slots or openings in the bracket 1 and have threaded thereto nuts 14. The plate 7 is further provided with an opening 15 normally closed by the plates 8 and 9 and is adapted to receive a ratchet gear 16 and a spring pressed dog 18. The ratchet gear is provided with a squared opening to receive the squared faces 19 on the shank 20 of a bolt 21. The bolt 21 extends through the plates 7, 8 and 9 and also through the bracket and has threaded thereon a nut 22 forming an integral part of a cap 23 adapted to overlie and conceal the nuts 14 and thereby prevent the removal of said nuts 14 from their respective bolts 12. The dog and ratchet gear permit rotation of the bolt 21 in one direction or in a direction to thread the nut 22 thereon drawing the cap over the nuts 14. However, the bolt 21 is held against retrograde rotation by the dog and ratchet gear. Thus it will be seen that when the tag is secured to the bracket 1 by our invention it is necessary that the fastening means of the device will have to be mutilated or destructed to remove the tag. It will be seen from the foregoing description and accompanying drawing that the various parts of this invention, such as the channel member 3 and the plates 7, 8 and 9 may be made from dies in a stamping machine, thereby materially reducing cost of manufacture of the device and further it will be noted that this device consists of a minimum number of parts and is easily applicable to the tag and its supporting bracket.

While we have shown and described the preferred embodiment of our invention, it will be understood that minor changes in construction, combination and arrangement of parts may be made without departing from the spirit and scope of our invention, as claimed.

Having described the invention, we claim:

1. A license tag protecting device comprising a holding head to engage one face of a license tag, a combined ratchet mechanism and tag securing means carried by the head and including bolts to extend through a support for the tag, one of said bolts being held against retroactive movement by said ratchet mechanism, nuts for said bolts, and means cooperating with said combined ratchet and securing means to enclose the nuts.

2. A license tag protecting device comprising a head, a member carried by said head, bolts having their ends concealed in said member and extending through a tag and a support, nuts threaded to said bolts, and means for enclosing the nuts to prevent removal from their respective bolts.

3. A license tag protecting device comprising a head, a member carried by said head, bolts having their ends concealed in said member and extending through a tag and a support, nuts threaded to said bolts, a bolt extending through the head, member, license tag and its support, and a cap threaded to the second-named bolt and enclosing the nuts of the first-named bolts, and means for holding the second-named bolt against retrograde rotation.

4. A license tag protecting device comprising a head, a member carried by said head, bolts having their ends concealed in said member and extending through a tag and a support, nuts threaded to said bolts, a bolt extending through the head, member, license tag and its support, a cap threaded to the second-named bolt and enclosing the nuts of the first-named bolts, and a ratchet mechanism between the second-named bolt and the member to prevent retrograde rotation of the second-named bolt.

ALBERT T. MILLER.
PERCY C. MILLER.